Figure 1:
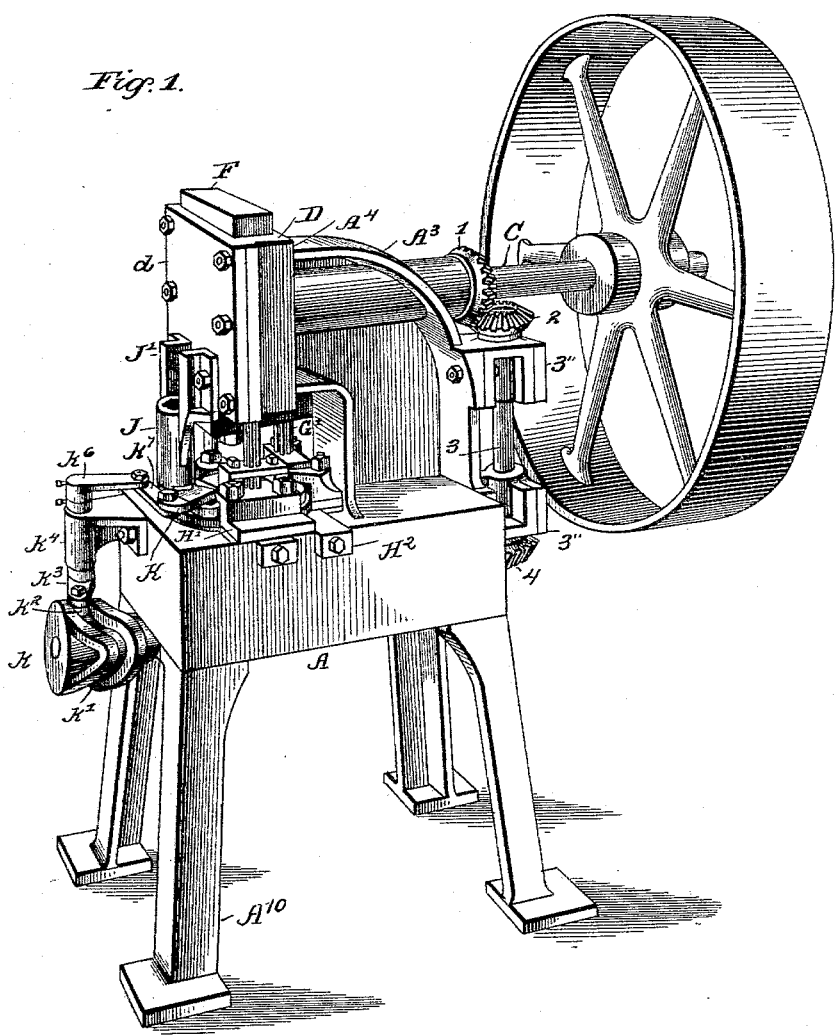

(No Model.)  6 Sheets—Sheet 1.
F. G. DU PONT.
MACHINE FOR SHAPING SMOKELESS POWDER.

No. 569,669. Patented Oct. 20, 1896.

Witnesses
Victor J. Evans.
O. E. Braitmayer

Inventor
Francis G. Du Pont
by E. M. Marble & Sons
Attorneys (No Model.)

F. G. DU PONT.
MACHINE FOR SHAPING SMOKELESS POWDER.

No. 569,669. Patented Oct. 20, 1896.

Witnesses
Victor J. Evans.
O. W. Braithway

Inventor
Francis G. Du Pont.
by E. M. Marble & Sons
Attorneys (No Model.) 6 Sheets—Sheet 4.
F. G. DU PONT.
MACHINE FOR SHAPING SMOKELESS POWDER.

No. 569,669. Patented Oct. 20, 1896.

Witnesses
Victor J. Evans.
O E Braitmayer

Inventor
Francis G. Du Pont.
by E. M. Marble & Sons
Attorneys

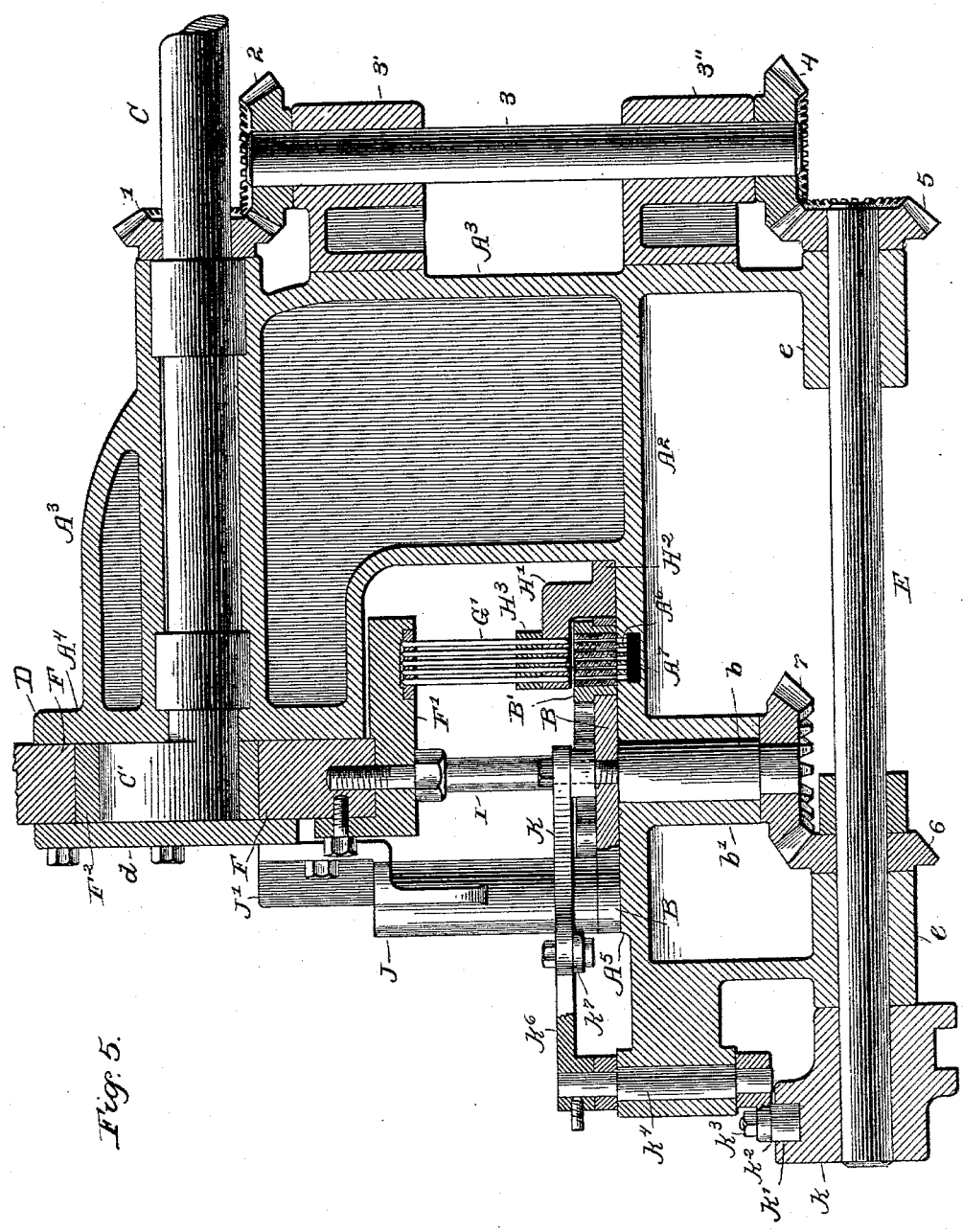

(No Model.)  6 Sheets—Sheet 6.

F. G. DU PONT.
MACHINE FOR SHAPING SMOKELESS POWDER.

No. 569,669. Patented Oct. 20, 1896.

Witnesses
Victor J. Evans.
O. Brautmayer

Inventor
Francis G. Du Pont.
by E. M. Marble & Sons
Attorneys

THE NORRIS PETERS CO., PHOTO-LITHO., WASHINGTON, D. C.

UNITED STATES PATENT OFFICE.

FRANCIS G. DU PONT, OF WILMINGTON, DELAWARE.

MACHINE FOR SHAPING SMOKELESS POWDER.

SPECIFICATION forming part of Letters Patent No. 569,669, dated October 20, 1896.

Application filed August 1, 1896. Serial No. 601,352. (No model.)

*To all whom it may concern:*

Be it known that I, FRANCIS G. DU PONT, a citizen of the United States, residing at Wilmington, in the county of New Castle and State of Delaware, have invented certain new and useful Improvements in Machines for Shaping Smokeless Powder; and I do hereby declare the following to be a full, clear, and exact description of the invention, such as will enable others skilled in the art to which it appertains to make and use the same.

My invention relates to improvements in machines for shaping smokeless powder, and particularly to improvements in that class thereof adapted to form perforations in grains of powder; and it consists in a machine for cutting sticks of smokeless powder into grains or pellets and forming perforations in the grains or pellets thus produced, the construction and arrangement of the parts of which will be hereinafter fully described, and particularly pointed out in the claims.

Heretofore perforations have generally been formed in grains of smokeless powder during the process of molding or casting a plastic mass of explosive into sticks having a cross-section corresponding to that designed for the finished grains of explosive, such sticks being afterward cut into grains or pellets of the desired thickness.

One object of my invention is to form perforations in grains of smokeless powder, not by a process or machine which operates during the molding or casting of a plastic mass of explosive into the desired form, but by mechanism acting upon the finished grains and treating each grain separately. In this manner I have found that I am able not only to form perforations in the grains of powder more rapidly than can be done with processes now used and to produce more perfect grains, but to obtain grains which will admit the flame to the perforations formed therein more readily than is the case with grains produced by the machines or processes now employed.

A further object of my invention is to provide a machine which will perform the operations necessary to be performed in order to produce perforated grains of smokeless powder in succession and continuously, so that a number of grains may be under treatment at the same time, and which will cut sticks of explosive into grains or pellets as fresh grains are required in the operation of the machine, thus causing the machine to supply itself with grains.

A further object of my invention is to provide a machine for cutting sticks of explosive into grains or pellets and forming perforations in the grains or pellets thus produced, which will be simple and compact in construction, easily operated, economical in power expended, and adapted for the treatment of grains of varying sizes.

In accomplishing the object of my invention I have devised a machine in which a carrier is caused to move with an intermittent forward movement in the path of operation of a reciprocating cross-head. To the carrier are attached a series of cells provided with chambers adapted to receive the grains or pellets of explosive. Dies may also be fitted in these chambers to permit the treatment of small-sized grains of explosive, or grains of differing outward configuration. Above the carrier the tools which are designed to act upon the grains, in order to form therein the required perforations and to finally eject the grains from the machine, are so located on a reciprocating cross-head or tool-carrier as to act in succession upon the grains, which are carried with an intermittent forward motion across the path of operation of the same. Grains are constantly supplied to the cell-chambers of the cells formed on the surface of the carrier as such cells reach a position registering or corresponding with the open mouth of a feeding-tube supported above the same. This is accomplished by the operation of cutting mechanism, which acts upon sticks of explosive fed downward in a suitable manner through the feeding-tube, the portion of the stick of explosive which projects into the chamber formed in the cell being severed from the remainder thereof at each actuation of the cutting mechanism. A new grain or pellet suited to receive perforations is thus formed. With a machine thus constructed the operations of cutting sticks of explosive into grains, forming perforations in the grains thus produced, and ejecting the perforated grains from the machine are performed in succession upon the grains under treatment, and a number of grains are always under treatment at the same time. At each movement of the carrier a finished grain is expelled from the machine and a new grain formed.

In my present machine the carrier which I use is endless and is in the form of a disk, upon the upper surface of which are secured cells provided with chambers adapted in size and inward formation for the reception of the grains of explosive to be treated. Over the path of travel of the carrier is supported in suitable guides a reciprocating tool-carrier or cross-head, to which are attached the tools designed to act upon the grains of powder, form perforations therein, and finally eject them from the machine. The carrier or disk is caused to rotate with an intermittent forward movement, so that grains held in the cells thereof will be successively treated by each of the operating-tools and finally ejected from the machine. The supply of grains to the cells is effected through the operation of a vibrating knife, which is pivoted centrally of the carrier-disk and is caused to vibrate between the upper face of each cell and the lower end of the feeding-tube at the close of each of the forward movements of the carrier-disk, which brings in succession the cells under, or in registering position with, the mouth of such feeding-tube. In the feeding-tube sticks of explosive are placed, and are forced downward by suitable means, automatic or otherwise, so that at the close of each intermittent forward movement of the disk or carrier the lower end of the stick of explosive will be forced into the chamber in the cell which is at that moment in registering position with the mouth of the feeding-tube. The cutting-knife is now caused to vibrate between the lower end of the feeding-tube and the upper face of the die and to separate the end of the stick of explosive projecting below the mouth of the feeding-tube from the main body of the stick of explosive, thus forming a grain or pellet of powder. The perforations are produced in the grains of explosive by the action of punches, secured, as before stated, to the reciprocating cross-head. I prefer to use two sets of punches, the first set acting to form the perforations in the grains of powder, and the second set acting to enlarge and perfect the perforations so formed, as thereby I find I am able to secure the best results.

The reciprocation of the cross-head bearing the operating-punches, as well as the feeding of the sticks of explosive into the dies and the operation of the cutting mechanism, are timed to take place while the carrier-disk is stationary, a locking device being used to insure the retention of the carrier in proper position during the action of such mechanisms.

The operation of my machine is continuous and is as rapid as is consistent with the action of the tools upon the explosive.

My machine is fully illustrated in the drawings which accompany and form a part of this application, in which the same reference letters and numerals are used to designate the same or corresponding parts, and in which—

Figure 2:
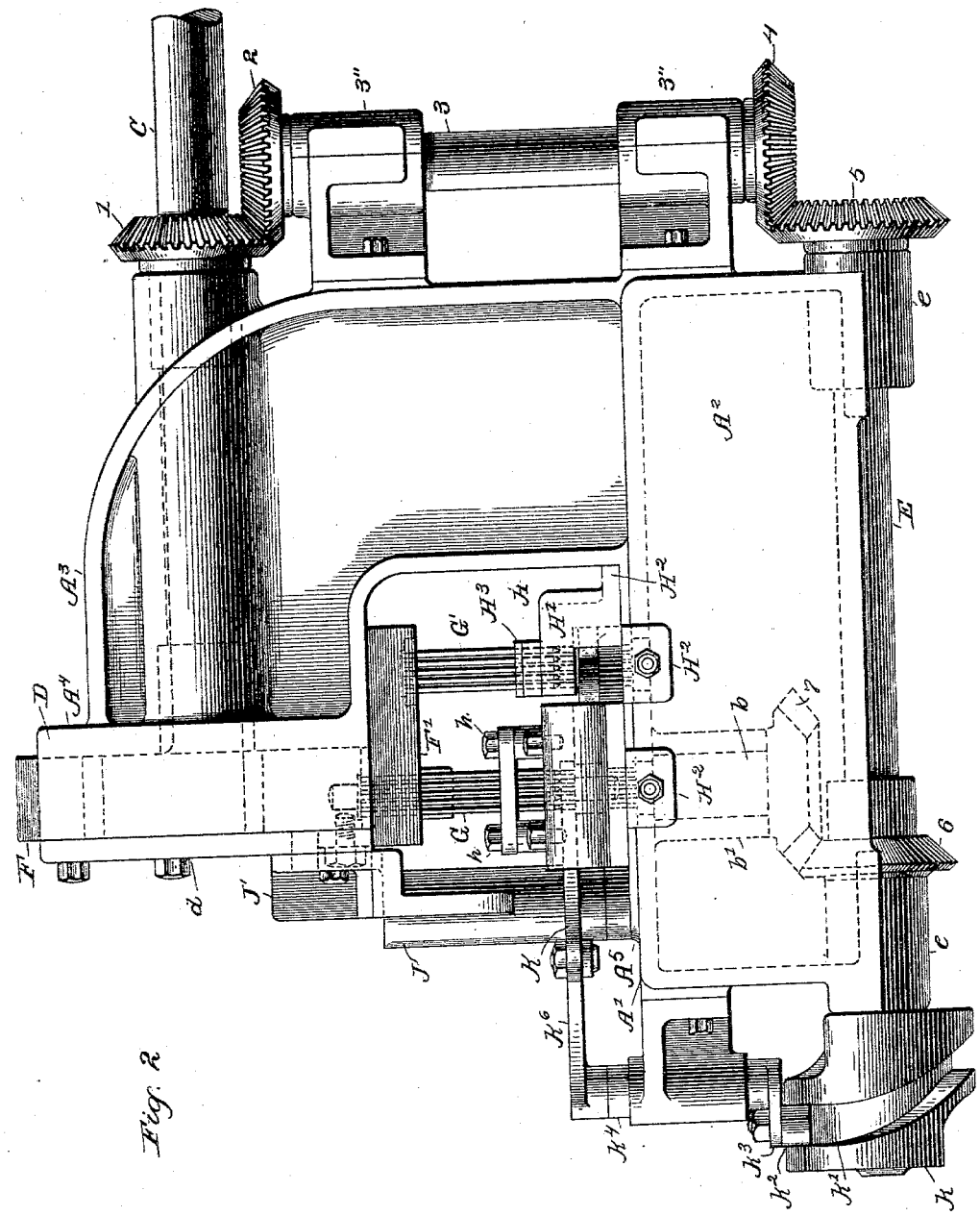
Figure 3:
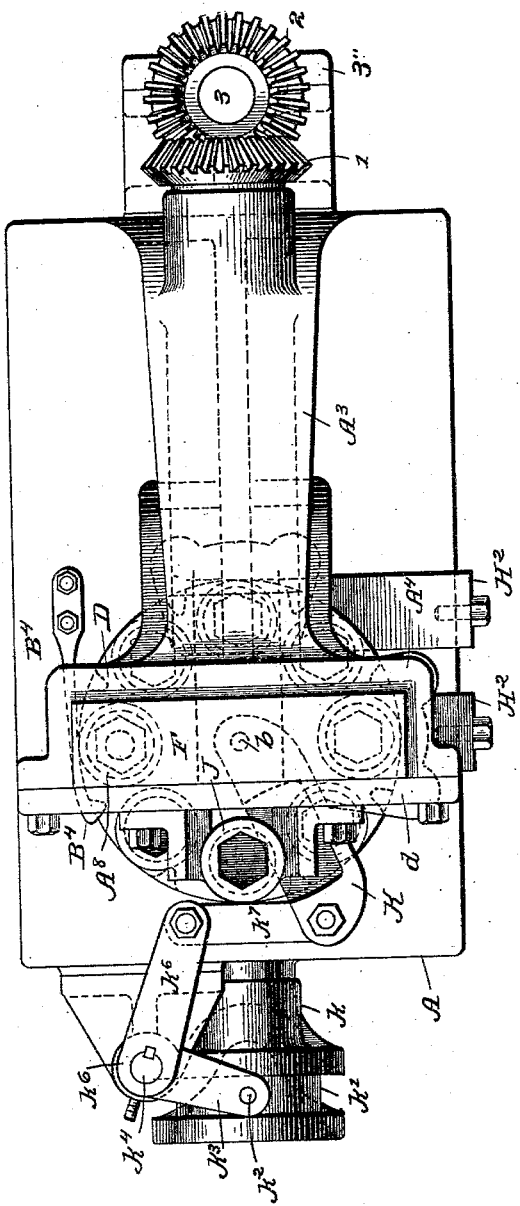
Figure 4:
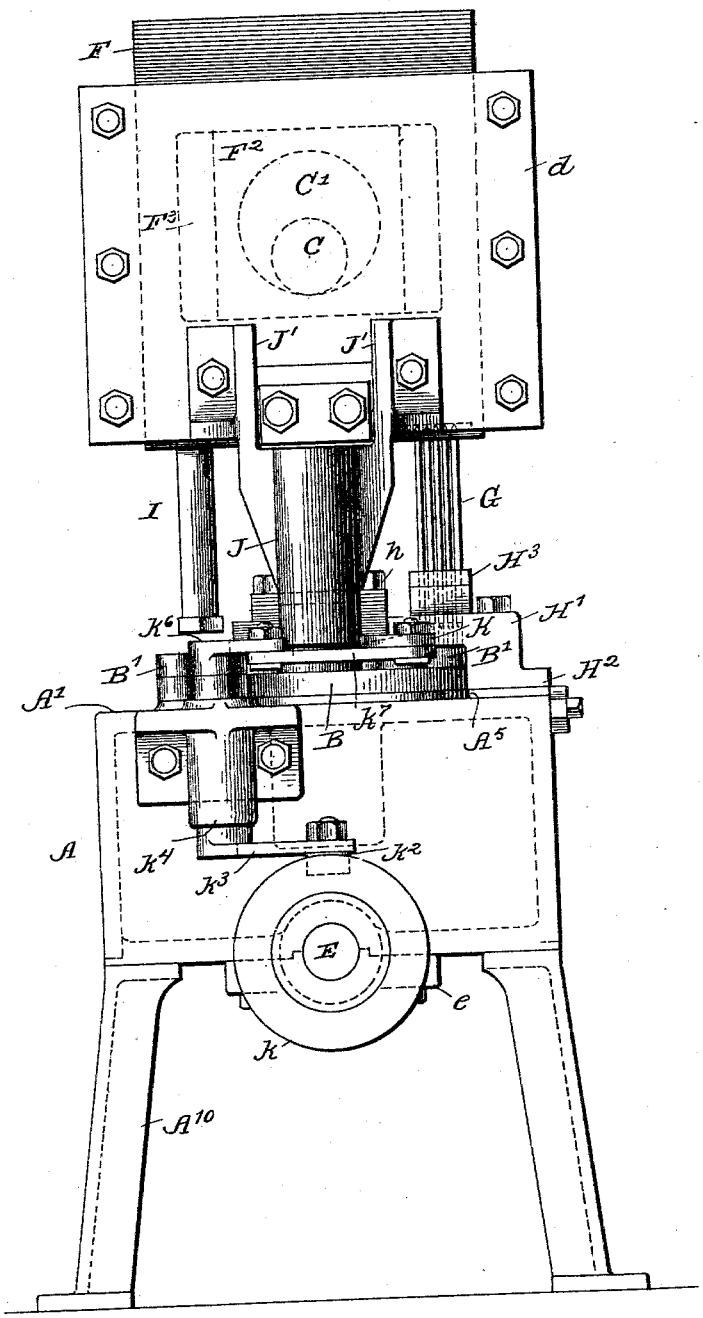
Figures 6, 8:
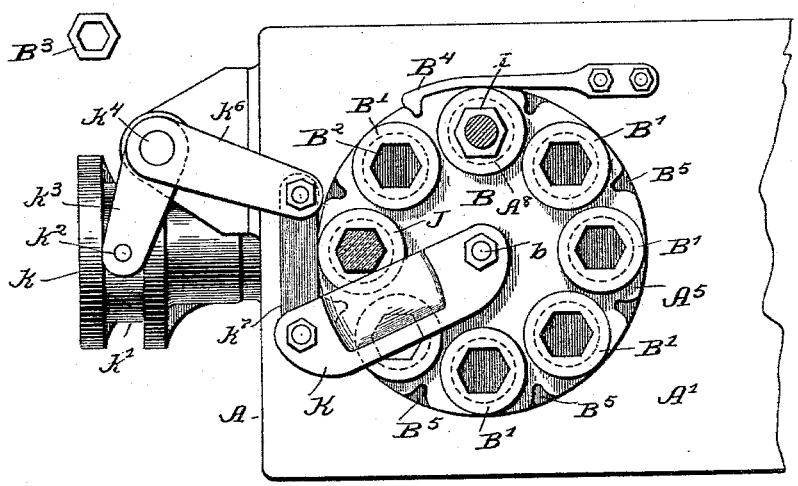
Figure 7:
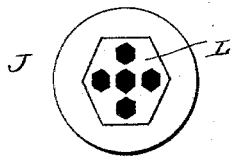

Figure 1 is a general perspective view of my machine. Fig. 2 is a side elevation thereof. Fig. 3 is a top plan view thereof. Fig. 4 is an end view thereof, showing the feeding and cutting mechanisms. Fig. 5 is a central vertical section of my machine, showing especially the reciprocating tool-carrier and the operative mechanism therefor. Fig. 6 is a detail view of the disk-carrier and cutting-knife. Fig. 7 is a detail view of a die and feeding-tube designed for use with small-sized sticks of explosive. Fig. 8 is a detail view of a die designed for use with sticks of explosive slightly smaller than those used ordinarily.

Referring to the drawings, A represents the body of the machine. It is a single casting and forms the bed-plate or table $A'$, upon the upper surface of which the disk-carrier B rotates, the sides $A^2$ of the machine-frame, the webbing $A^3$, in which a bearing is formed for the power-shaft C and which supports the reciprocating cross-head F, and the main portion $A^4$ of the cross-head guide D. In the lower portion of the casting A are formed bearings for the supplemental power-shaft E, so that the casting forms not only the bed-plate on which all the machine operations take place, but also serves as a journal for the two power-shafts of the machine and as the main portion of the guideway for the reciprocating cross-head. This centralization of functions renders my machine very compact and also strong and durable.

The machine is supported on legs $A^{10}$, so that the bed-plate or table and the operating-tools will be high enough to be convenient to the operator.

In the description of my machine which follows I shall first describe the carrier-disk and the operative mechanism connected therewith, and then I shall describe in succession the reciprocating cross-head and the parts connected therewith, the cutting-knife and the actuating mechanism therefor, and finally the operation of the machine as a whole.

*Carrier-disk and operative mechanism therefor.*—The machine bed-plate or table $A'$ is rectangular in shape, and may be considered as divided into two portions—a front portion, in which the carrier-disk B operates, and a rear portion, which is occupied by the webbing $A^3$, which webbing serves to support the cross-head guide $A^4$ and forms a journal for the main power-shaft of the machine. The front portion of the table is formed with a circular raised portion $A^5$, which is faced so as to be perfectly smooth. It is over this portion of the bed-plate or table that the carrier-disk B moves in its rotation. The carrier-disk B is mounted upon the vertical shaft $b$, and is so supported as to rotate with its under surface just clearing the raised portion $A^5$ of the bed-plate $A'$. The thickness of the disk is determined by structural reasons, it being necessary to have the disk thick enough to make it strong and durable. The diameter of the disk hinges upon the necessity of providing a periphery of sufficient extent to allow for the attachment thereto of the desired number of cells or dies in which the grains of explosive are to be received. The cells or dies B' are secured to the upper surface of the carrier-disk and are arranged close together. In the machine shown in the drawings I use eight such cells, though this number may be varied, if desired. The cells are formed with an opening or chamber $B^2$ of the shape of the grains of explosive which are to be received therein. I preferably make the chamber $B^2$ in the cells of sufficient size to receive the largest-sized grains which are to be treated, and provide for the treatment of smaller grains by using dies $B^3$, which are inserted in the cells $B^2$, and which themselves have an inner opening or chamber corresponding with the size of grain in connection with which they are to be used.

An intermittent forward movement is imparted to the carrier-disk B by a gearing connection with the power-shaft C, which is as follows: On the power-shaft C is mounted a beveled gear 1, which meshes with a corresponding beveled gear 2 on a vertical shaft 3. The vertical shaft 3 is mounted in bearings 3' and 3", which are bolted to the frame of the machine, and bears upon its lower end a beveled gear 4, which meshes with a corresponding beveled gear 5 upon the intermediate power-shaft E. The power-shaft E is mounted in bearings $e$, formed in the machine-frame, and bears the mutilated gear 6, which meshes with a beveled gear 7, mounted on the lower end of the vertical shaft $b$, on which the carrier-disk B is mounted. The vertical shaft $b$ rotates within a bearing $b'$. As in my present construction I make use of eight cells upon the carrier-disk, and as I wish each of these cells to be in succession brought under the various operating-tools and subjected to the action thereof, it is necessary to provide for the forward movement of the carrier-disk one-eighth of a revolution for each complete revolution of the power-shaft and operation of the perforating-tools. This is arranged for by the ratio of teeth used on the gears 6 and 7. On the gear-wheel 7 I have formed eight teeth, corresponding to the number of cells secured to the surface of the carrier-disk, while on the gear-wheel 6, which, as before said, is mutilated, I form only a single tooth, so that with each complete revolution of the power-shaft the gear-wheel 6 will act to turn the gear-wheel 7, and thereby the carrier-disk, one-eighth of a revolution.

In order to insure the proper movement of the carrier-disk to its several stations and to make certain its retention in a stationary position during the operation of the perforating-tools, I have provided a spring-locking pawl $B^4$, which is secured to the table or bed-plate A' and presses with its notched end into recesses $B^5$, formed on the side of the disk, corresponding in number to the number of positions or stations to be occupied by the disk in a complete revolution. The locking-pawl $B^4$ is forced out of the recess with which it engages while the carrier-disk is at rest when each movement of such carrier-disk occurs; but at the conclusion of the step movement of such carrier-disk it springs into the recess next following the one with which it was formerly engaged and locks the carrier-disk from further movement until the next revolution of the power-shaft and gears connected therewith. As the head of the locking-pawl is V-shaped, and as it engages with correspondingly-shaped recesses in the periphery of the disk, complete uniformity in position of the disk in its respective stations is secured.

*Reciprocating cross-head and parts connected therewith.*—The reciprocating cross-head F, to which the perforating-punches G and G' and the ejecting-punch I are secured, is supported so as to be directly over the carrier-disk B. The guideway D for the cross-head or tool-carrier is formed by a portion $A^4$ of the main machine-casting A and a plate $d$, which is bolted or otherwise secured to the casting $A^4$. The cross-head is rectangular in form and reciprocates in a correspondingly-shaped opening in its guideway. To the bottom of the cross-head is secured the angle-plate F', to which is attached one set of the perforating-punches. The perforating-punches and ejector are so placed on the cross-head as to be above the chambers in the cells, which are in succession brought beneath the same. Reciprocating motion is imparted to the cross-head by the action of an eccentric C', which is keyed to the main power-shaft C and is held within a laterally-sliding block $F^2$, which moves within an oblong opening $F^3$, cut in the cross-head F. The reciprocating movement of the cross-head is sufficient in extent to cause the sharpened ends of the perforating-punches G and G' to pass completely through the grains of explosive held in the cells secured to the upper surface of the carrier-disk and enter openings $A^6$, corresponding in size and number to the punches used, which are formed in the thickened portion $A^5$ of the bed-plate or table. In order to guide the perforating-punches in their movement and insure the exact operation of the same, I provide guides H therefor. The guides H consist of bent plates H', to the lower portion of which are attached flanges $H^2$, which extend over the edge of the bed-plate or table and are bolted or otherwise secured thereto, so as to hold the guiding-plates H in position. In the other or raised portion of the guides, which are in the line of travel of the perforating-punches, are formed perforations corresponding in size and number to the punches with which the guides are used, and to this portion of the guides are also secured by bolts $h$ supplemental guides $H^3$, which are likewise formed with perforations corresponding in number and size to the punches used in connection therewith and which assist in insuring exact vertical movement of the punches. It will be seen, therefore, that the perforating-punches G and G' are at all times guided in their movement, so that no deviation from an exact line is possible. The portions of explosive which they remove in their action from the grains under treatment are ejected through the perforations $A^6$, formed in the thickened portion of the table, and thence fall through circular openings $A^7$, formed in the bed-plate.

The number of perforating-punches used in each set of punches depends upon the size of the grain under treatment and the rapidity with which it is desired such grain shall burn. In treating large-sized grains I usually prefer to form therein a large number of perforations, in order to insure the quick combustion of the same, but the number of perforations formed in the grains may be varied at will as desired. As shown in the drawings, I prefer to make the second set of punches which act upon the grains of explosive under treatment somewhat larger than the first set in order to expand and perfect the perforations formed therein.

To eject the finished grains from the cells in which they are held, I make use of a punch I, which is formed with a head on its lower end corresponding in size to the apertures formed in the cells or to the grains under treatment. The grains are forced out of the machine through the opening $A^8$, formed in the bed-plate A'.

*Feeding and cutting mechanism.* — The sticks of explosive which are to be cut into grains are fed to the machine through a feeding-tube J, which is supported in upright position in registering line with the line of travel of the cells secured to the upper surface of the carrier-disk by upwardly-extending flanges J', bolted to the face-plate $d$ of the guideway D of the reciprocating cross-head. The feeding-tube J has a single opening corresponding in size and shape to the sticks of explosive to be fed therethrough. The feeding of the sticks of explosive downward through the feeding-tube may be effected by hand or in any other suitable manner, as desired—such as by automatic means. The step-by-step forward movement of the carrier-disk is so arranged that at the termination of each step movement of the same a cell is in registering position with the lower end of the feeding-tube, so that the stick of explosive which is contained in such tube is readily forced down until its lower end occupies the cell-chamber. The cutting of that portion of the stick of explosive which is now within the cell-chamber from the body of the stick, and thereby the formation of a grain of explosive of the desired thickness, is accomplished by the action of the cutting-knife K. This knife is pivoted centrally of the carrier-disk, and is arranged to vibrate at each actuation thereof across the mouth of the feeding-tube and between the lower end of the same and the upper surface of the cell in registering position therewith. The edge of the knife toward the feeding-tube is sharpened, so as to facilitate the cutting of the stick of explosive, but the body of the knife is made thick and heavy, so that it will not break or give in its operation. The reciprocating movement of the knife which results in the formation of the grains or pellets of explosive results from the action of the following mechanism.

Upon the end of the supplemental power-shaft E, which extends to the front of the machine, is mounted a cam $k$. In the groove $k'$, formed in the same, travels a roller $k^2$, which is mounted upon the end of a crank-arm $k^3$, to the other end of which is secured a vertical stud-shaft $k^4$, journaled in a lug $k^5$, projecting from the machine-frame. On the upper end of the vertical shaft $k^4$ is secured a lever $k^6$, to the outer end of which is secured a link $k^7$, which is likewise attached to the end of the vibrating knife K. With each revolution of the power-shaft C and the corresponding revolution of the intermediate power-shaft E the roller $k^2$ is caused to travel through the cam-groove $k'$, formed on the periphery of the cam $k$. The sizes and adjustment of the parts are so regulated that by each revolution of the power-shaft C and the corresponding revolution of the supplemental shaft E a throw of the crank $k^3$ results which is sufficient to turn the stud-shaft $k^4$, to which it is keyed, through an angle which causes the vibration of the cutting-knife K completely across the mouth of the feeding-tube, and thereby the severing from the body of the stick of explosive contained in the feeding-tube of the portion thereof which is in the cell-chamber.

The timing of the parts is so adjusted that the reciprocation of the cross-head, the feeding of the stick of explosive into the cell-chamber, and the reciprocation of the cutting-knife all occur while the carrier-disk is held stationary. Undue friction and injury to the parts are thus avoided.

*Operation of the machine.*—In the operation of my machine sticks of explosive are introduced in the feeding-tube I and are fed downward by suitable means, so that at the termination of each intermittent step movement of the carrier-disk the lower end of the stick of explosive will enter the chamber of the cell, which is at that moment in registering position beneath the feeding-tube. Upon the immediately-following reciprocation of the cross-head and cutting-knife the end of the stick of explosive which is in the cell-chamber is severed or cut from the body of the stick and is formed into a grain or pellet of powder of the desired thickness. In the succeeding step-by-step movements of the disk-carrier the grain of explosive thus formed is subjected to the action of the first and second sets of perforating-punches and is finally ejected from the machine by the action of the ejecting-punch I. No undue friction is caused by carrying the grain of explosive across the surface of the faced portion $A^5$ of the bed-plate or table $A'$, because the grains of explosive, while firmly seated in the cell-chamber, are not forced downward against the portion of the table over which they pass. The action of the first set of perforating-punches is to form in the grain perforations of the desired number. These perforations are expanded by the action of the second set of perforating-punches, so that they reach the desired size. The upper side of the grain, where the perforating-punches enter, remains smooth, but just as the punches reverse their movement they draw some little particles of material into the openings or perforations, causing a sort of fringe around such holes or perforations, which is conducive to admitting the flame more readily than if the fringe were not there.

Should it be desired to treat small-sized sticks of explosive, I insert dies in the cell-chambers which are formed with a number of interior openings corresponding in size and configuration to the sticks of explosive to be treated, and insert in the feeding-tube H a guide or partition L, (shown in Fig. 7,) which divides such feeding-tube into a series of chambers corresponding in size and configuration to the sticks of explosive to be treated and the openings formed in the cell-chambers. In this manner the sticks of explosive are fed together into the cell-chamber and cut into grains, and a number of finished grains are ejected from the machine at each actuation thereof.

Having thus fully described my invention, what I claim as new, and desire to secure by Letters Patent, is—

1. In a machine for perforating grains of explosive, the combination with a carrier having a series of cells to receive the grains, and means for moving said carrier intermittently forward, of means for supplying said cells with grains, perforating mechanism, and an ejector, substantially as described.

2. In a machine for perforating grains of explosive, the combination with a disk having a series of cells to receive the grains, and means for rotating said disk with an intermittent movement, of means for supplying said cells with grains, perforating mechanism, and an ejector, substantially as described.

3. In a machine for perforating grains of explosive, the combination with a disk having a series of cells to receive the grains, a power-shaft, and gear connection between said disk and said power-shaft adapted to rotate said disk with an intermittent movement, of means for supplying said cells with grains, perforating mechanism, and an ejector, substantially as described.

4. In a machine for cutting sticks of explosive into grains, the combination with a carrier having a series of cells to receive the grains, and means for moving said carrier intermittently forward, of a feeding-tube adapted to discharge into said cells, a knife, and means for causing said knife to pass across the mouth of said tube after each intermittent movement of said carrier, substantially as described.

5. In a machine for cutting sticks of explosive into grains, the combination with a carrier having a series of cells to receive the grains, and means for moving said carrier intermittently forward, of a feeding-tube adapted to discharge into said cells, a vibrating knife adapted to pass across the mouth of said tube, and means for operating said knife after each intermittent movement of said carrier, substantially as described.

6. In a machine for cutting sticks of explosive into grains, the combination with a disk having a series of cells to receive the grains, and means for rotating said disk with an intermittent motion, of a feeding-tube adapted to discharge into said cells, a knife pivoted centrally of said disk, cam-actuated mechanism for causing said knife to move across the mouth of said tube and means for operating said knife after each intermittent movement of said disk, substantially as described.

7. In a machine for perforating grains of explosive, the combination with a carrier having a series of cells formed therein, and means for moving the same intermittently forward, of means for supplying said cells with grains of explosive, a reciprocating cross-head stationed over the line of travel of said carrier, and perforating and ejecting devices carried thereby, substantially as described.

8. In a machine for perforating grains of explosive, the combination with a carrier having a series of cells to receive the grains, and means for moving said carrier forward with an intermittent motion, of a reciprocating cross-head having a transverse opening therein stationed over the line of movement of said carrier, a suitable guideway therefor, a sliding block mounted in said opening, a power-shaft, a cam thereon fitted in said block, and perforating and ejecting devices carried by said cross-head, substantially as described.

9. In a machine for perforating grains of explosive, the combination with a table having discharge-openings therein, a disk resting thereon having cells to receive the grains, means for rotating said disk with an intermittent movement, and means for supplying said cells with grains, of a reciprocating cross-head, perforating-punches and an ejector carried thereby, guides for said punches, and means for reciprocating said cross-head, substantially as described.

10. In a machine for perforating grains of explosive, the combination with a table, a disk resting thereon having a notched periphery and having cells to receive the grains, means for rotating said disk with an intermittent movement, a locking-pawl engaging with said notched periphery, and means for supplying said cells with grains, of a reciprocating cross-head, and perforating and ejecting mechanism carried thereby, substantially as described.

11. In a machine for cutting sticks of explosive into grains and perforating the grains thus formed, the combination with a table having discharge-openings formed therein, a disk resting thereon having a series of cells to receive the grains, a feeding-tube adapted to discharge into said cells, cutting mechanism adapted to reciprocate across the mouth of said feeding-tube at the close of each forward movement of said disk, and a reciprocating cross-head having perforating and ejecting devices secured thereto, of a power-shaft, and mechanism thereon and in gearing connection therewith for causing said disk to rotate with an intermittent forward movement, and for causing the reciprocation of said cross-head and operation of said cutting mechanism, substantially as described.

12. In a machine for cutting sticks of explosive into grains and perforating the grains thus formed, the combination with a table having discharge-openings formed therein, a disk resting thereon having a series of cells to receive the grains, a feeding-tube adapted to discharge into said cells, a cutting-knife pivoted centrally of said disk and adapted to reciprocate across the mouth of said feeding-tube at the close of each forward movement of said disk, a reciprocating cross-head having perforating and ejecting devices secured thereto and having a transverse opening formed therein, suitable support therefor, and a sliding block mounted in said opening, of a power-shaft, a cam thereon adapted to fit in said sliding block and cause the reciprocation of said cross-head, an intermediate shaft in gearing connection with said power-shaft, and mechanism thereon for causing intermittent forward movement of said carrier and the operation of said cutting-knife, substantially as described.

In testimony whereof I affix my signature in presence of two witnesses.

FRANCIS G. DU PONT.

Witnesses:
FRANK E. HALEY,
JOHN W. MACKLERN.